(12) United States Patent
Gosselin (10) Patent No.: US 7,422,781 B2
(45) Date of Patent: Sep. 9, 2008

(54) TAMPER INDICATING DEVICES AND METHODS FOR SECURING INFORMATION

(75) Inventor: Raymond R. Gosselin, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 198 days.

(21) Appl. No.: 10/828,453

(22) Filed: Apr. 20, 2004

(65) Prior Publication Data

US 2004/0209028 A1 Oct. 21, 2004

Related U.S. Application Data

(60) Provisional application No. 60/464,243, filed on Apr. 21, 2003.

(51) Int. Cl.
*B32B 9/00* (2006.01)
*B32B 33/00* (2006.01)
*B32B 7/12* (2006.01)
*B32B 15/04* (2006.01)
*B42D 15/00* (2006.01)
*B42D 15/10* (2006.01)

(52) U.S. Cl. .................. 428/40.1; 428/40.1; 428/42.1; 428/343; 428/354; 428/915; 428/916; 283/72; 283/94; 283/98; 283/101

(58) Field of Classification Search ................ 428/915, 428/916, 40.1, 41.8, 42.1, 354, 815; 283/72–114
See application file for complete search history.

(56) References Cited

U.S. PATENT DOCUMENTS

| | | |
|---|---|---|
| RE24,906 E | 12/1960 | Ulrich |
| 3,329,478 A | 7/1967 | Garlet |
| 3,993,826 A | 11/1976 | Butler et al. |
| 4,000,824 A | 1/1977 | Han |

(Continued)

FOREIGN PATENT DOCUMENTS

DE 197 05 380 6/1998

(Continued)

OTHER PUBLICATIONS

Tamper evident delaminating film, as described in PCT Publication WO 00/43977, published Jul. 27, 2000 was offered for sale in the United States by applicant prior to Oct. 25, 1999.

(Continued)

*Primary Examiner*—Patricia L Nordmeyer
(74) *Attorney, Agent, or Firm*—Melissa E Buss (57) ABSTRACT

A tamper indicating device. A preferred embodiment of the invention provides a backing having a first side and a second side, wherein the backing comprises a first phase and a second phase, wherein the backing has a first level of light diffusion, and when a peeling force is applied to the backing, the backing fractures or internally delaminates and has a second level of light diffusion that is a higher level of light diffusion than the first level of light diffusion; a flood coat applied to the second side of the backing, the flood coat defining a window therein; and a mask applied to the tamper indicating device, the mask being in partial or whole registration with the window in the flood coat.

28 Claims, 6 Drawing Sheets

U.S. PATENT DOCUMENTS

| | | | |
|---|---|---|---|
| 4,125,662 A | 11/1978 | Weiner et al. | |
| 4,147,827 A | 4/1979 | Breidt, Jr. et al. | |
| 4,239,826 A | 12/1980 | Knott, II et al. | |
| 4,252,851 A | 2/1981 | Lansbury et al. | |
| 4,254,169 A | 3/1981 | Schroeder | |
| 4,356,221 A | 10/1982 | Anthony et al. | |
| 4,362,844 A | 12/1982 | Lemstra et al. | |
| 4,364,981 A | 12/1982 | Horner et al. | |
| 4,398,985 A | 8/1983 | Eagon | |
| 4,419,408 A | 12/1983 | Schmukler et al. | |
| 4,419,411 A | 12/1983 | Park | |
| 4,539,256 A | 9/1985 | Shipman | |
| 4,545,832 A | 10/1985 | Hoffmann | |
| 4,557,505 A | 12/1985 | Schaefer et al. | |
| 4,630,891 A | 12/1986 | Li | |
| 4,652,473 A | 3/1987 | Han | |
| 4,713,273 A | 12/1987 | Freedman | |
| 4,721,638 A | 1/1988 | Matsuguchi et al. | |
| 4,726,984 A | 2/1988 | Shah | |
| 4,737,559 A | 4/1988 | Kellen et al. | |
| 4,759,816 A | 7/1988 | Kasper et al. | |
| 4,784,885 A | 11/1988 | Carespodi | |
| 4,828,915 A | 5/1989 | Schroeder et al. | |
| 4,876,123 A | 10/1989 | Rivera et al. | |
| 4,888,075 A | 12/1989 | Freedman | |
| 4,946,532 A | 8/1990 | Freeman | |
| 4,980,222 A | 12/1990 | Rivera et al. | |
| 5,061,262 A | 10/1991 | Chen et al. | |
| 5,082,702 A | 1/1992 | Alband | |
| 5,143,570 A | 9/1992 | Freedman | |
| 5,153,042 A | 10/1992 | Indrelie | |
| 5,190,812 A | 3/1993 | Joseph et al. | |
| 5,277,915 A | 1/1994 | Provonchee et al. | |
| 5,277,971 A | 1/1994 | Weng et al. | |
| 5,346,259 A | 9/1994 | Mocilnikar et al. | |
| 5,358,281 A | 10/1994 | Greig | |
| 5,372,669 A | 12/1994 | Freedman | |
| 5,384,170 A | 1/1995 | Bastioli et al. | |
| 5,405,692 A | 4/1995 | Weng et al. | |
| 5,589,122 A | 12/1996 | Leonard et al. | |
| 5,633,058 A | 5/1997 | Hoffer et al. | |
| 5,660,922 A | 8/1997 | Herridge et al. | |
| 5,660,925 A | 8/1997 | Cooley et al. | |
| 5,677,360 A | 10/1997 | Yamamori et al. | |
| 5,700,564 A | 12/1997 | Freedman | |
| 5,721,086 A | 2/1998 | Emslander et al. | |
| 5,770,283 A | 6/1998 | Gosselin et al. | |
| 5,804,610 A | 9/1998 | Hamer et al. | |
| 5,985,075 A | 11/1999 | Freedman | |
| 6,004,656 A | 12/1999 | Gosselin et al. | |
| 6,040,027 A | 3/2000 | Freedman | |
| 6,138,830 A | 10/2000 | Muggli | |
| 6,270,122 B1 * | 8/2001 | Shadle et al. | 283/95 |

FOREIGN PATENT DOCUMENTS

| | | |
|---|---|---|
| DE | 196 53 891 C1 | 9/1998 |
| EP | 0 349 160 A2 | 1/1990 |
| EP | 0 404 402 A2 | 12/1990 |
| EP | 0 210 261 B1 | 6/1991 |
| EP | 0 408 971 B1 | 3/1995 |
| EP | 0 651 365 | 5/1995 |
| EP | 0 681 913 A1 | 11/1995 |
| EP | 0 335 425 B1 | 1/1997 |
| EP | 0 845 767 A1 | 6/1998 |
| FR | 2 664 609 A1 | 1/1992 |
| GB | 2 211 760 A | 7/1989 |
| WO | WO 93/06183 | 4/1993 |
| WO | WO 86/04547 | 8/1996 |
| WO | WO 98/56581 | 12/1998 |
| WO | WO 00/43977 | 7/2000 |

OTHER PUBLICATIONS

Plastics Films, Third Edition, by John H. Briston, Longman Scientific & Technical in association with the Plastics and Rubber Institute, Introduction page and pp. 74-79.

* cited by examiner

TAMPER INDICATING DEVICES AND METHODS FOR SECURING INFORMATION

CROSS REFERENCE TO RELATED APPLICATION

This application claims priority to U.S. Provisional Patent Application No. 60/464,243, filed Apr. 21, 2003.

TECHNICAL FIELD

The invention relates to devices for securing objects or information, particularly tamper indicating devices, and more particularly, to devices such as tapes, labels, and label stock that indicate tampering attempts through fracturing and/or internal delamination.

BACKGROUND OF THE INVENTION

A number of devices and methods are known for securing information on articles. See for example, U.S. Pat. Nos. 4,980,222 and 5,770,283.

One example of such a device for securing information is a scratch-off lottery card or ticket. The secured information (such as a winning number to be hidden) is printed on the card, and then covered with a scratch-off layer during manufacture of the card. The recipient of the card (such as a purchaser) scratches off the scratch-off layer with a coin, fingernail or the like, thus revealing the hidden number.

Not only does the scratch-off layer produce debris, but also the scratching process potentially damages the secured printed information underneath the scratch-off layer. When the hidden number matches the winning number (which may be widely known), the person who has bought the winning card and scratched off the layer to reveal the hidden winning number wins a prize. The winning number needs to be secured before the lottery ticket leaves the secure manufacturing site of the tickets. Even when the winning number is kept secret before its announcement, it is still necessary to secure the winning number on the card because the card might not yet be sold at the time of the announcement of the winning number. Otherwise, this could allow the winning ticket to be selectively purchased to win the prize.

This system of securing the secured information (e.g. the winning number on the lottery ticket) has the advantage that when the information is revealed, the card is irreversibly altered so that it is obvious that the secured information has been revealed. If the card is received in an altered state, that is, with the scratch-off layer missing or damaged, the card is void. Alternatively, a duplicate card could be printed including the winning number and a scratch-off coating applied over the number so as to duplicate the winning lottery ticket.

In addition to securing information, these devices may primarily serve to indicate when information has been accessed or when an object has been tampered with. Such devices are well known as tamper indicating devices, which may be adhered to a variety of objects. In general, tamper indicating devices are activated and changed irreversibly in some way when their removal from an object is attempted. These devices can provide security, for example, to the contents of a container. The container can be fastened with a tamper indicating device applied in such a way that when the container is opened, the device is activated and irreversibly changed. These changes are covertly or, more commonly, overtly detectable.

For example, a tamper indicating tape can be fastened across the flaps of a carton to close it and protect the contents of the container. Because such devices cannot be easily removed without activation, the device cannot be removed and re-adhered to another object, such as a counterfeit object without the replacement being detected.

One particular tamper indication device is a film such as a Tamper Evident Delaminating (TED) film, which utilizes a mixture of incompatible polymers such that when an attempt is made to remove the film (for example, in the form of adhesive tape) from a substrate (such as a sealed package) the film internally "delaminates," causing the two polymers in the film to separate and split apart. See for example, U.S. Pat. No. 4,876,123.

Typically, devices of the art contain secured information, and therefore such devices need to be individually manufactured for each article when such information is unique to each article. There is a need for devices that can be used to secure information on objects when the information is already attached to the object in some way.

SUMMARY OF THE INVENTION

Briefly, in one aspect of the invention, one embodiment of a tamper evident device is provided comprising tamper indicating: a tamper indicating backing having a first side and a second side, wherein the tamper indicating backing comprises a first phase and a second phase, wherein the backing has a first level of light diffusion, and when a peeling force is applied to the backing, the backing fractures and has a second level of light diffusion that is a higher level of light diffusion than the first level of light diffusion; a flood coat applied to the second side of the backing, the flood coat defining a window therein; and a mask applied to the top surface of the tamper indicating device, the mask being in partial or whole registration with the window in the flood coat. Optionally, in another embodiment of the tamper evident device may further comprise an overlaminate layer and/or one or more skin layers.

BRIEF DESCRIPTION OF THE DRAWINGS

FIGS. 9A, 9B and 9C are photographs showing embodiments of a tamper indicating device of the invention attached to an object;

DETAILED DESCRIPTION OF THE INVENTION

The present invention provides a tamper indicating device that secures information when the information is attached to an object. Even though the information or access can easily be revealed, in doing so the tamper indicating device indicates irreversibly that tampering has occurred and information has been revealed. Furthermore, replacement of the tamper indicating device with a counterfeit tamper indicating device is difficult and requires relatively sophisticated manufacturing techniques to duplicate the tamper indicating device.

The tamper indicating devices may also be used when the secured information is part of the object to which the tamper indicating device is attached. Another example of when the information is part of the object would be when the surface of an object is transparent and the secured information can be read through that surface. In one embodiment of the tamper indicating device 10 that contains a mask feature, application of the tamper indicating device to an object obscures the secured information from view. In either case, the secured information is said to be on the object. The same type of tamper indicating device may be used with different objects carrying different pieces of secured information without each tamper indicating device being uniquely manufactured to include variable secured information.

The tamper indicating devices of the present invention may be attached to a variety of different objects. The tamper indicating devices can also be used to secure access to objects. When secured information is visual information such as indicia, images, holograms, barcodes or the like, attempts to reveal or remove the secured information will activate the tamper indicating device. Activation of the tamper indicating device (whether deliberate or accidental) causes irreversible changes within the tamper indicating device. Such damage occurs because of tampering, such as attempts to remove the tamper indicating device, attempts to access secured information, or attempted access of an object being secured. The tamper indicating device is then examined to determine whether the secured information has been successfully accessed, that is, whether the secured information has been revealed or altered.

Figure 8:
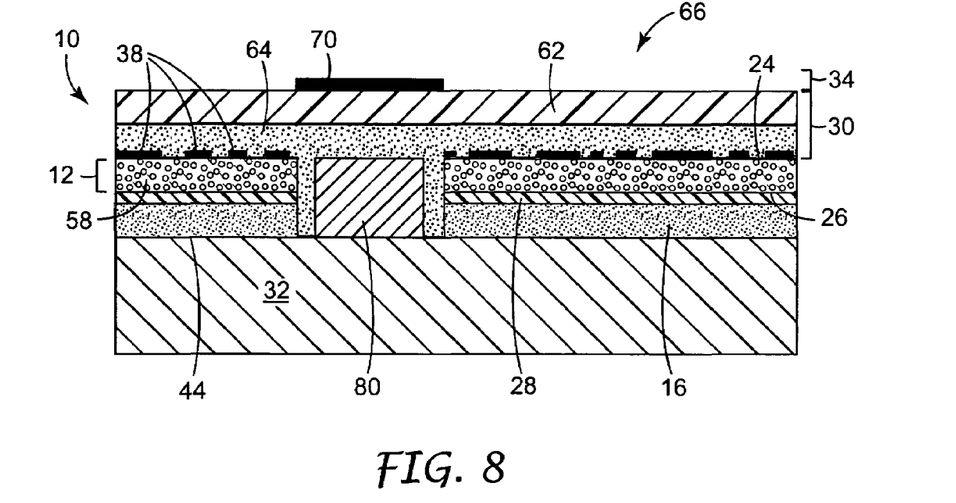
FIG. 8 shows schematically in cross section a further embodiment of a tamper indicating device of the present invention affixed to an object to form an article, wherein the tamper indicating device has a die cut window.

The tamper indicating device can also be used to cover objects such as screw heads on casing accesses, wherein opening of the casings might, for example, void a warranty. The tamper indicating device can also be used to secure such things as computer chips, integrated circuits, radio frequency identification tags, miniature antennae or other electronic tamper indicating devices or components. FIG. 8 illustrates one example of using the tamper indicating device of the present invention to indicate unauthorized access to an object 80.

Figure 1:
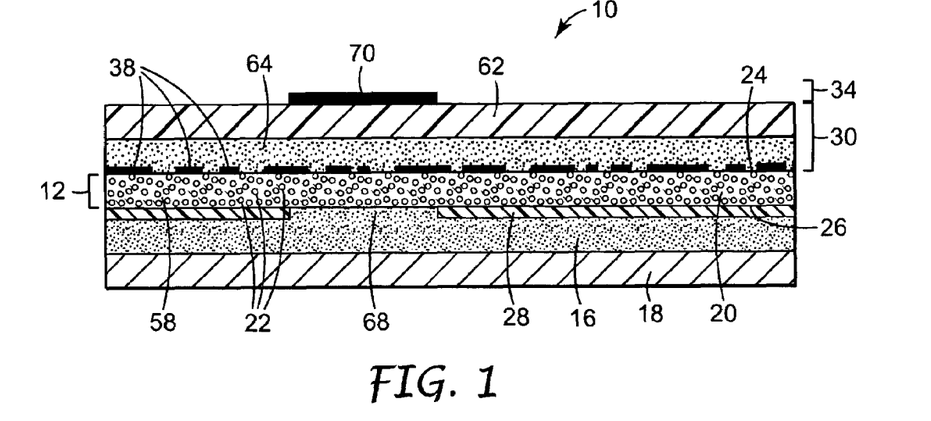
FIG. 1 shows schematically in cross section an embodiment of a tamper indicating device of the present invention that includes a release liner and an overlaminate layer.

One preferred embodiment of a tamper indicating device 10 according to the present invention is shown in FIG. 1. The tamper indicating device 10 is typically a tape or label. Tamper indicating device 10 includes tamper indicating backing 12, flood coat 28 applied to the second side 26 of backing 12 and an adhesive layer 16, such that adhesive layer 16 is bonded to flood coat 28. Tamper indicating backing 12 has a first side 24 and a second side 26 opposite the first side 24.

When tamper indicating device 10 does not have a flood coat 28, then adhesive layer 16 is bonded directly to the second side of backing 12. In embodiments where a window 68 is in the flood coat 28 (as explained in more detail below) the adhesive 16 adheres to the backing 12 through window 68. When tamper indicating device 10 does not have adhesive layer 16, then tamper indicating device 10 may be attached to an object by other adhesive means. Alternatively, adhesive could be applied to the object to which the tamper indicating device is to be bonded, or could be applied to the flood coat or to the second side of the tamper indicating backing so that the tamper indicating device is bonded to the object to form an article. Tamper indicating device 10 preferably includes mask 70, overlaminate 30 that includes a film 62 and adhesive layer 64. The Figures illustrate different embodiments of the tamper-indicating device 10.

Figure 6:
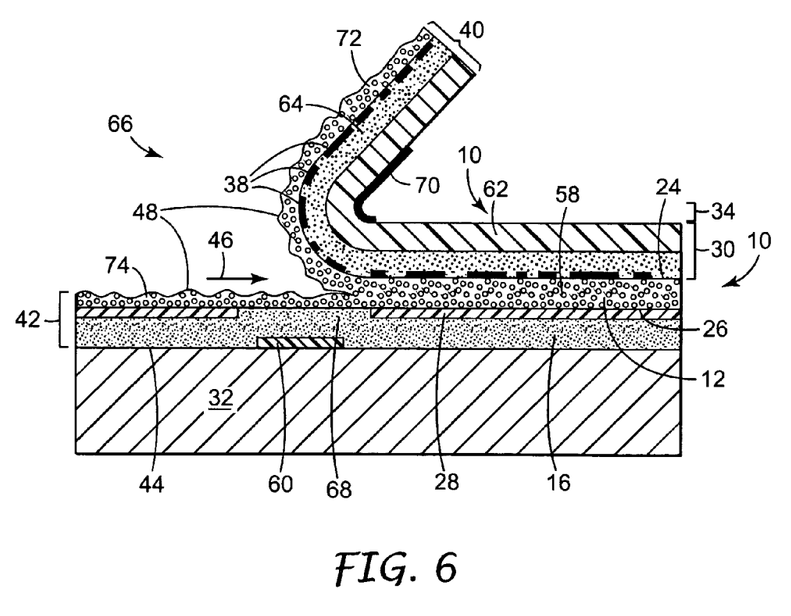
FIG. 6 shows schematically in cross section the article of FIG. 4, wherein the tamper indicating device of the present invention is activated, and the tamper indicating backing is delaminated.
Figure 7:
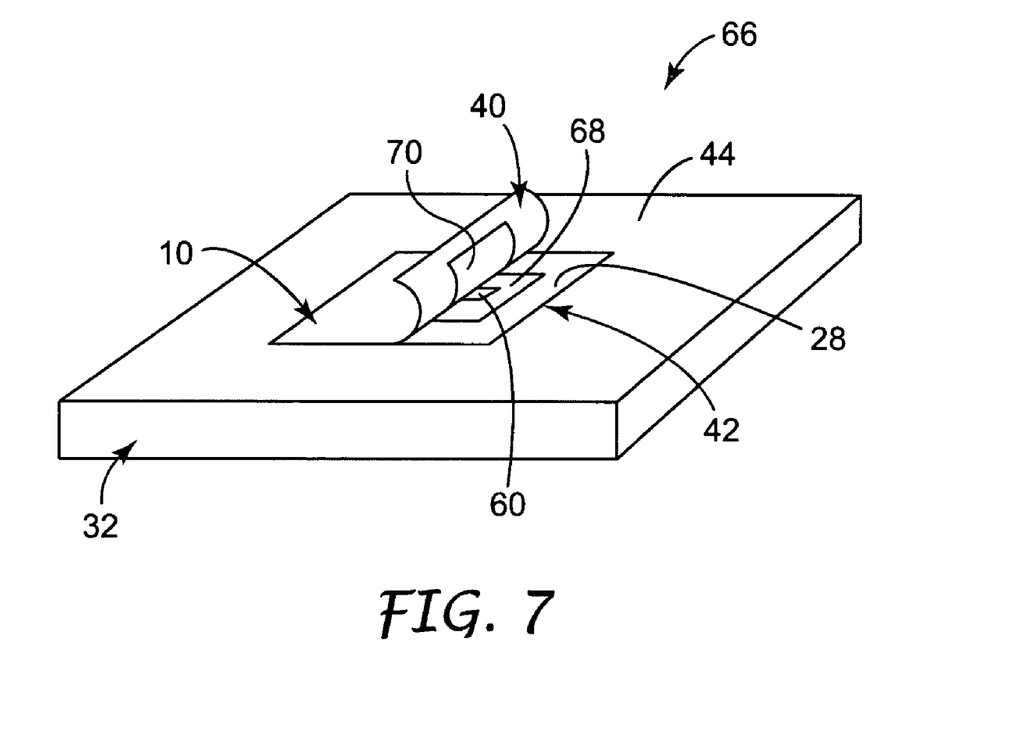
FIG. 7 shows an embodiment of a tamper indicating device of the present invention attached to an object to form an article, wherein the tamper indicating device is activated and the tamper indicating backing is delaminated.

Tamper indicating device 10 is applied to object 32 so that mask 70 entirely obscures or partially obscures the secured information 60 when tamper indicating device 10 is viewed from the top surface 34. "Obscures" means that secured information is not readily perceptible. For example, mask 70 may be opaque and block the visible image of the secured information. Mask 70 may camouflage the secured information. Mask 70 may be a signal blocker of some type, such as a radio frequency shield. Mask 70 can combine with the secured information in some way, such that secured information is not clear. Mask 70 preferably obscures at least 5% of the secured information, more preferably 50% and most preferably 100%. The information may be revealed by activation of the tamper indicating device by peeling the first portion 40 of the tamper indicating device 10 away from the second portion 42 of tamper indicating device 10 as shown in FIG. 6. Frangible film 58 fractures or internally delaminates, such that the first portion 40 of tamper indicating device 10 can be peeled back revealing secured information 60 viewable or otherwise detectable through the second portion 74 of frangible film 58. Secured information 60 appears within window 68 in flood coat 28, so that flood coat 28 does not obscure the secured information 60 after activation of tamper indicating device 10, i.e., removal or peel-back of first portion 40 of tamper indicating device 10. Such action irreversibly activates the tamper indicating device 10. The first portion 40 of the tamper-indicating device 10 cannot be replaced to indicate that tamper indicating device 10 was not activated.

Returning to the embodiment illustrated in FIG. 1, security markings 38 indicate the condition of the tamper indicating device 10, that is, whether the tamper indicating device 10 has been activated or not. Preferably, the security markings 38 are the same color as the flood coat 28. For example, the security markings 38 may be colored blue and flood coat 28 may also be colored the same or a similar blue color. The security markings 38 are thus not initially visually perceptible in the tamper indicating device 10, or the security markings are perceived with difficulty before activation of the tamper indicating device 10.

Optionally, second security markings may be disposed on the second side 26 of the tamper indicating backing 12. Second security markings preferably are of a contrasting color to security markings 38 and flood coat 28. Second security markings may be disposed between the second side 26 of the tamper indicating backing 12 and the flood coat 28, or between the flood coat and adhesive layer 16. When second security markings are present, then preferably there is a second flood coat disposed on the first side 24 of the tamper indicating backing 12. Second flood coat and second security markings can be substantially the same color so that second security markings are not perceptible before activation of the tamper indicating device 10 because of insufficient contrast with second flood coating, as explained above relative to the first security marking flood coat 28. When the tamper indicating device is activated, such as when first portion 40 of the tamper indicating device is peeled back or removed, the second flood coat no longer obscures second security markings, and so second security markings are revealed or become clearer. Second security markings and second flood coat are not illustrated in the embodiments in the Figures.

Preferably, the separated first portion 40 of the tamper indicating device 10 will not re-adhere internally to the second portion 42 after the tamper indicating backing 12 has been internally delaminated by the peeling force. The tamper indicating device 10 thereby provides a reliable indication of unauthorized access to the secured information 60. It should be noted that the peel force used to remove the tamper indicating device 10 from the object 32 may not cause complete internal delamination and instead may cause partial internal delamination or fracturing of the tamper indicating device 10.

Tamper indicating devices, which internally delaminate and are thus activated and become opaque, are disclosed in U.S. Pat. No. 4,876,123 or 4,980,222, the entire disclosures of both of which are incorporated herein by reference.

In yet another embodiment, a tamper indicating backing preferably is a frangible film, and it may contain one or more additional layers. One such additional layer can form the first side of the tamper indicating backing, one such additional layer can form the second side of the tamper indicating backing, or both major surfaces (the first side and the second side) of the tamper indicating backing can be formed from such additional layers, including but not limited to prime layers, adhesive layers, printing receptor layers, and layers comprising polymers.

In addition, one or both sides of the tamper indicating backing may be treated by means known to those skilled in the art to improve adhesion of adjacent layers or adhesion of flood coat to the backing or on the backing to improve printing. Such techniques would include corona treatment or e-beam treatment.

Tamper indicating backing 12 preferably includes frangible film 58 containing a mixture of at least two polymeric materials sufficiently incompatible so as to form two phases, a first phase 20 and a second phase 22, within frangible film 58. A predetermined level of cohesion is formed between the first 20 and second 22 phases such that when a peel force is applied to pull the first side 24 and second side 26 of tamper indicating backing 12 away from each other, the tamper indicating backing 12 internally delaminates within frangible film 58 (shown in more detail in FIG. 6). Typically, first phase 20 is continuous and second phase 22 is discontinuous with the second phase 22 forming a multiplicity of inclusions (typically spherical or ellipsoidal bodies enclosed in the first phase 20 material) within frangible film 58. When frangible film 58 completely delaminates, continuous first phase 20 splits along the inclusions of second phase 22. "Fracturing" of backing 12 occurs when first side 24 of tamper indicating backing 12 is subjected to a force pulling it (the first side) away from second side 26 of tamper indicating backing 12 but frangible film 58 does not completely separate and instead only separates at isolated fracture points. Internal delamination occurs when the film 58 separates into two separate and distinct portions 72, 74, as illustrated in FIG. 6. Tamper indicating device 10 is activated when either fracturing or internal delamination of the frangible film 58 occurs.

The frangible film 58 is typically constructed of a first copolymer comprising at least one olefinic monomeric unit and a second copolymer comprising at least one vinyl alcohol monomeric unit. The two copolymers are sufficiently incompatible to each other that two phases are formed within the film. Such films can be made into tapes that can include various colorants and indicia (for example, printed lettering or flood coating) that provide an indication of tampering, as well as including an adhesive layer for adhering the film to an article. When the film delaminates, such as upon attempts to remove it from a container, it can become less transmissive, that is, it becomes opaque. This opacity is relied upon to make other indicia or other information less visible when the film delaminates. The opacity can also be used to make indicia or information become more readily perceptible after internal delamination of the film.

Frangible films 58 have high light transmissivity levels and low haze, even though the phase separated morphology due to the incompatibility of the first and second materials might be expected to form opaque frangible films. It is believed that the relative size of the inclusions formed by the second phase 22 and the closeness of the refractive indices of the components of tamper indicating backing 12 are such that tamper indicating backing 12 has good light transmissive properties (that is, such that flood coat 28 can be viewed through the tamper indicating backing 12). The inclusions formed by the second material typically are approximately 1 micron or smaller, although the invention is not limited to this size. While not wishing to be bound by any theory, it is believed that the inclusions formed by the second, discontinuous phase 22 provide a pattern of weaknesses within the first, continuous phase 20 of the first material. To a certain extent, the cohesive force of tamper indicating backing 12 can be predetermined to a desired level depending on the materials and ratios of materials selected in formulating the frangible film 58.

Preferably, tamper indicating backing 12 is formed by the blown film extrusion process. Forming tamper indicating backing 12 in this manner allows it to be made thinner than was previously available for tamper evident delaminating films. Preferably, tamper indicating backing 12 is less than approximately 0.003 inches (0.076 mm) thick. Such thin tamper indicating backings 12 provide the advantage of preventing objects (fingernails, razor blades, and the like) from being inserted between the second side of tamper indicating backing 12 and the object to which the tamper indicating device 10 is being adhered. When items can be inserted below the tamper indicating backing 12, it is much more likely that the tamper indicating device 10 can be defeated, since when the tamper indicating device can be "pried" off, sufficient opposing forces may not be generated between the first 24 and second 26 sides of the tamper indicating backings, thereby activation does not occur. Thus, thin tamper indicating backings 12 are more effective tamper indicating devices 10. Additionally, thinner tamper indicating backings 12 require less material to manufacture and are more economical to produce. An example of these types of tamper indicating backings is disclosed in PCT Application No. WO 00/43977, which is hereby incorporate by reference.

As discussed previously, tamper-evident films produced using the co-extrusion blown film process are overall very thin and facilitate good tamper indication. Further details of this process may be found in U.S. Pat. No. 6,416,857, which is hereby incorporated by reference.

In one embodiment, tamper indicating backing 12 comprises a co-extrusion blown film derived from a composition comprising about seventy-five percent of the material of the first phase 20 and about twenty-five percent of the material of the second phase 22. Such tamper indicating backings are disclosed in U.S. Pat. No. 6,416,857. Preferred compositions for skin layers are also described therein. First phase material 20 is preferably a random copolymer of polypropylene and polyethylene with the polyethylene comprising approximately four percent of the copolymer, such as FINA 8473 available from FINA Oil and Chemical Company, Dallas, Tex. Second phase material 22 preferably is an ethylene/vinyl alcohol copolymer having 44% molarity of ethylene and 56% molarity of vinyl alcohol, such as EVAL E105A available from EVAL Company of America, Lisle, Ill. Although the above composition of the frangible film 58 is exemplary, it should be noted that any formulations resulting in a frangible film is contemplated and is within the scope of the present invention.

Figure 3:
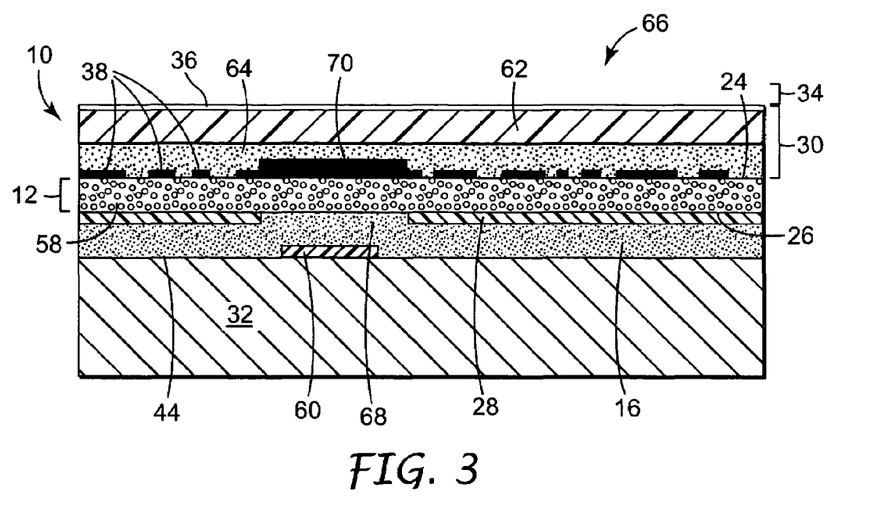
FIG. 3 shows schematically in cross section an embodiment of a tamper indicating device of the present invention that includes an overlaminate layer, wherein the tamper indicating device is affixed to an object to form an article, and wherein the mask is located on the first side of the tamper indicating backing.
Figure 4:
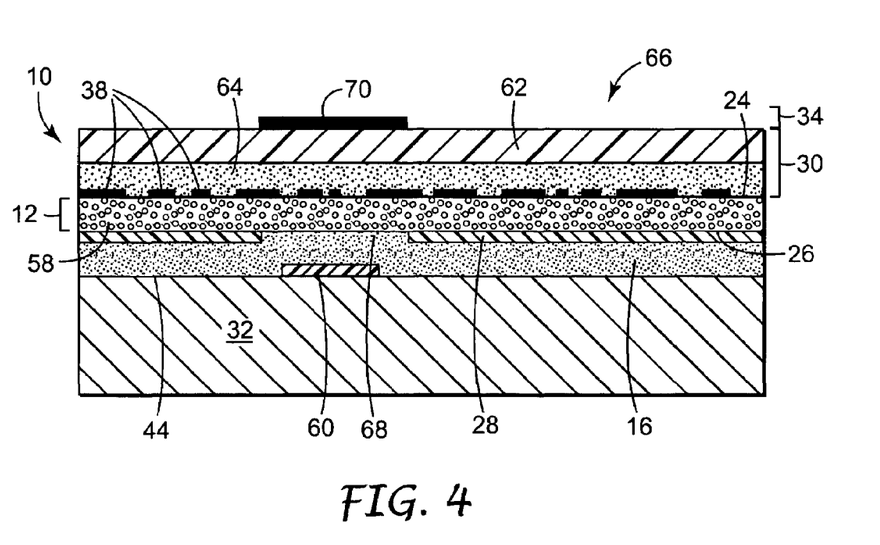
FIG. 4 shows schematically in cross section an embodiment of a tamper indicating device of the present invention that includes an overlaminate layer, wherein the tamper indicating device is affixed to an object to form an article, and wherein a mask is located on the surface of the overlaminate film.
Figure 5:
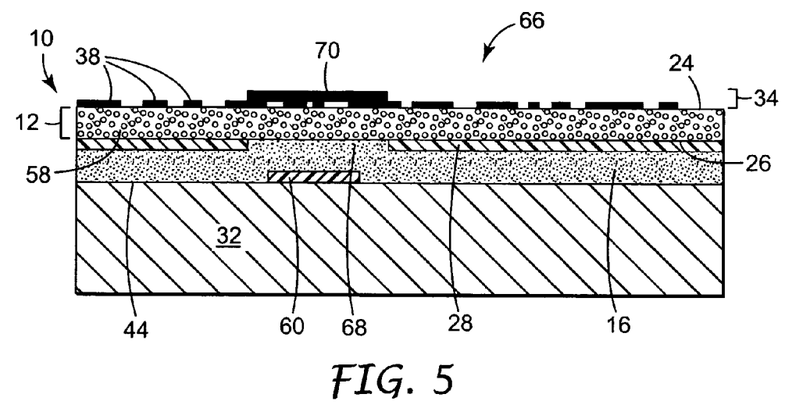
FIG. 5 shows schematically in cross section an embodiment of a tamper indicating device of the present invention that does not include an overlaminate layer, wherein the tamper indicating device is affixed to an object to form an article, and wherein a mask is located on the first side of the tamper indicating backing.

Tamper indicating device 10 may also include a mask 70. Mask 70 obscures secured information 60 so that the information is not visible without removal of mask 70. Attempted removal of mask 70 causes tamper indicating device 10 to activate. FIGS. 3 and 4 show embodiments wherein tamper indicating device 10 is affixed to an object 32. In FIG. 3, mask 70 is shown applied to first side 24 of tamper indicating backing 12 and covering security markings 38. Mask 70 may be located in this position on tamper indicating device 10 when tamper indicating device 10 includes overlaminate 30 or when tamper indicating device 10 does not include overlaminate 30 as shown in FIG. 5. In FIGS. 4, 6, and 8, mask 70 is shown applied to the top surface of overlaminate 30. In either of mask 70 positions exemplified in FIGS. 3 and 4, mask 70 can shield or cover or obstruct secured information 60, so that secured information 60 is illegible or encoded.

Mask 70 can obscure the information by blocking the path between secured information 60 and a viewer or detector of secured information 60 when secured information 60 is viewed or detected from the first side 24 of tamper indicating backing 12. However, mask 70 can also obscure or protect secured information 60 by other means. For example, when secured information 60 comprises red-colored indicia, mask 70 could simply be red coloration substantially matching red indicia in color, thus camouflaging the red indicia. Another example would be when secured information was indicia comprising ultraviolet (UV) ink, which is not viewable in the visible light spectrum but is viewable under ultraviolet light. Alternatively, a mask could comprise a printed layer of ink or colorant having similar UV absorption characteristics as that of the secured information 60.

Figure 2:
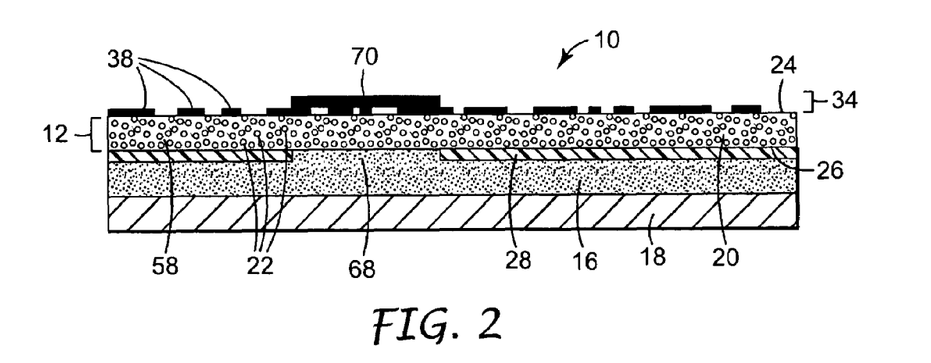
FIG. 2 shows schematically in cross section an embodiment of a tamper indicating device of the present invention that includes a release liner but does not include an overlaminate layer.

Alternatively, tamper indicating device 10 also may include a mask 70, which may be opaque. Mask 70 may be situated on the on the top surface 34 of the tamper indicating device 10 as shown in FIGS. 1, 4 and 6. When no overlaminate 30 is used, top surface 34 of the tamper indicating device is the first side 24 of the backing or the security markings in positions when the security markings are present. If no overlaminate 30 is present, mask 70 is either applied to the first side of the backing 24 with security markings 38 applied over the top of the mask, or mask 70 is applied to the first side of the backing and covers the security markings. These three positions for the mask 70 include the following: (i) on the top surface of the overlaminate when present as part of the tamper indicating device 10; (ii) without overlaminate on the first side 24 of the backing and between any security markings and the first side 24 of the backing; or (iii) without overlaminate on the first side 24 of the backing with security markings between the mask and the second side of the backing are all examples of mask 70 being on the top surface 34 of the tamper indicating device 10. Alternatively, mask 70 can be positioned at some other location within the tamper indicating device 10 when overlaminate 30 is part of tamper indicating device 10. For example, mask 70 may be applied between the adhesive 64 and security markings 38 as shown in FIG. 3, or mask 70 may be situated between the security markings 38 and the tamper indicating backing 12. When tamper indicating device 10 does not include an overlaminate 30, then mask 70 may be applied to the top surface 34 of tamper indicating device 10 onto security markings 38 as shown in FIGS. 2 and 5 or between security markings 38 and the first side 24 of the tamper indicating backing 12. Mask 70 can be applied by printing, coloring, coating, drawing, embossing, scratching, or applying an opaque material such as an adhesive-backed label. Mask 70 could also be a label such as a paper or plastic label with an adhesive. Such a label mask can be adhered to the desired position in the tamper indicating device 10. Mask 70 can be almost any printing or application or change to the top surface 34 of the tamper indicating device (such as scratched or embossed area), that causes secured information 60 to be illegible through the top surface 34 of the tamper indicating device. However, when tamper indicating device 10 is activated and fracture or internal delamination occurs within frangible film 58, mask 70 is removed with first portion 40 of the tamper indicating device 10 so that secured information 60 is accessible after activation of the tamper indicating device 10.

When there is a flood coat 28 with a window 68 therein, mask 70 is in partial or whole registration with window 68 that is, mask 70 preferably covers the majority of the window 68 when viewed from the top 34 of the tamper indicating device 10. Preferably, mask 70 covers at least 50% of window 68, more preferably greater than 75% of the window 68, most preferably 100% of the window 68. Mask 70 is said herein to be in whole registration with window 68, when mask 70 appears to cover 100% of the window 68 when viewed perpendicularly to the top of the tamper indicating device 10. Mask 70 is said herein to be in partial registration with window 68, when mask 70 covers part of the window 68 when viewed in a direction perpendicular to tamper indicating device 10.

In another embodiment, a tamper indicating backing 12 includes one or more skin layers (not shown in the Figures). Such a tamper indicating backing includes a first skin layer on one side of a frangible film and a second skin layer on the other side of the frangible film. The constructions are described in detail in U.S. Pat. No. 6,416,857, which is hereby incorporated by reference. However, tamper indicating backing can be made without skin layers, in which case tamper indicating backing might consist of the frangible tamper indicating film and no additional layers or films.

With reference to FIGS. 1 to 4, the tamper indicating device 10 preferably includes a flood coat 28 applied to the second side 26 of the tamper indicating backing 12. Flood coat 28 may be printed, coated, laminated, or otherwise applied to the second side 26 of the tamper indicating backing 12 using a number of techniques known in the art, one being printing. Flood coat 28 preferably comprises ink that can be printed using techniques known in the art such as flexographic printing or gravure printing. Tamper indicating backing 12 can include a second skin layer (not shown in the Figures), which forms the second side 26 of the tamper indicating backing. When tamper indicating backing 12 includes such a second skin layer, flood coat 28 can be printed or otherwise applied to the second skin layer. Flood coat 28 generally is colored and can be selected so that it contrasts with the color of the object to which the tamper indicating device is to be applied, or it can be selected so that it is similar to or matches the color of the application surface of the object.

Flood coat 28 preferably defines a window 68 that is an area without color from the flood coat 28. For example, when the flood coat 28 is a layer printed onto the second side 26 of backing 12, window 68 is an area on the second side of the backing where the flood coat is not present. Generally, window 68 is bound on two or more sides by colored flood coat 28 when viewed through the top surface 34 of tamper indicating device 10. Window 68 is an area where flood coat 28 is not applied, or it is an area of other material that is colorless or of a different color than the flood coat area.

It should be noted that other configurations of security markings (indicia and/or flood coats) may be used to indicate tampering without departing from the spirit and scope of the invention and are known to those skilled in the art.

Another embodiment of tamper indicating device 10 incorporates a colored adhesive layer 16 in place of flood coat 28. By coloring the adhesive layer 16 to match the color of the security markings 38, the security markings are camouflaged against the colored adhesive 16 in a similar fashion as was previously described with respect to the flood coat 28. In this case, it is desirable that the secured information 60 be visible through the colored adhesive without a window in the colored adhesive. Similarly, when present, a second skin layer may be manufactured so as to include pigments (in a manner known in the art) to provide camouflage instead of a flood coat 28 or colored adhesive 16. However, the flood coat is preferred because the flood coat can be printed onto the second side of the tamper indicating backing to easily define a window. The printing processes provide a wide variety of colors for the flood coat because of the wide variety of colored inks that are readily available for printing. Flood coat and/or adhesive layer can be pattern coated. Overlaminate layer 30 and/or removable liner 18 may be included in all of the above-described embodiments.

Although any suitable adhesive may comprise the adhesive layer 16 and adhesive layer 64, such as a heat activated or pressure sensitive adhesive, preferably adhesive layer is a pressure sensitive adhesive (PSA) layer. Pressure sensitive adhesives are normally tacky at room temperature and can be adhered to a surface by application of, at most, light finger pressure. A general description of useful pressure sensitive adhesives may be found in *Encyclopedia of Polymer Science and Engineering*, Vol. 13, Wiley-Interscience Publishers (New York, 1988). Additional description of useful pressure sensitive adhesives may be found in *Encyclopedia of Polymer Science and Technology*, Vol. 1, Interscience Publishers (New York, 1964). Examples of pressure sensitive adhesives include resin tackified synthetic rubber adhesives, and in particular styrene-butadiene rubber, styrene-isoprene-styrene block copolymer and styrene-butadiene-styrene block copolymer; and acrylic adhesives and in particular isooctylacrylate/acrylic acid copolymer; tackified natural rubber adhesives; and epoxy adhesives. A particularly preferred class of pressure sensitive adhesives is the (meth) acrylate based adhesives described in U.S. Pat. No. 5,804,610 (Hamer et al.), which is incorporated by reference in its entirety herein.

Pressure-Sensitive Adhesive

Pressure-sensitive adhesives suitable for use in the tamper indicating device 10 of this invention possess a number of physical and chemical characteristics including (i) an adhesive strength sufficient to prevent unintended peeling of the tamper indicating device from a substrate after prolonged exposure to the forces of nature and (ii) a relationship between adhesive strength and cohesive strength of the film such that the film will fracture or internally delaminate before the tamper indicating device can be removed from the object.

Selection of an optimal adhesive depends upon a number of factors including the composition of the other layers in the tamper indicating device and the particular object to which the tamper indicating device is to be applied.

Useful adhesives include specifically, but not exclusively, crosslinked acrylate adhesives, block copolymer adhesives, and rubber resin adhesives.

Rubber resin adhesives include synthetic rubbers, such as polyisoprene, natural rubbers, and synthetic block copolymers. Useful synthetic block copolymers are commercially available from such sources as Shell Chemical Co. and include styrene-isoprene-styrene (such as Kraton™ 1107) and styrene-butadiene-rubber (such as Kraton™ 1657). Rubber resin adhesives may also include solid and/or liquid tackifying resins, antioxidants, fillers and other common rubber additives.

Adhesives may be coated from solvent or compounded as a hot melt adhesive. The compounding and coating of various types of adhesives are known in the art and described in various publications including U.S. Pat. No. 3,329,478.

A particularly suitable pressure-sensitive adhesive for application to the various paper, glass, metallic and plastic surfaces is a crosslinked copolymer of (a) a hydrophobic acrylate monomer (monomer A), (b) a hydrophilic ethylenically unsaturated monomer (monomer B), and (c) a monoethylenically unsaturated crosslinking agent (monomer PX). The PX monomer is preferably a photosensitive crosslinking agent effective for crosslinking the copolymer upon exposure to ultraviolet radiation. Such adhesives are disclosed in U.S. Patent No. RE 24,906 and U.S. Pat. No. 4,737,559 issued to Keller et al., both of which are assigned to Minnesota Mining and Manufacturing Company of St. Paul, Minn. However, such pressure-sensitive adhesives may be modified by excluding chain terminating agents from the polymerization mixture.

The properties and characteristics of the adhesive compositions used in this invention are based upon a cooperative interaction of the various individual components. Consequently, efforts to describe the attributes contributed and/or influenced by each of the individual components is not necessarily indicative of the attributes possessed by the final adhesive composition. Such descriptions should therefore be used only as an indication of general trends and as a guide to those attributes, which should be carefully considered when selecting the other components of the composition.

When adhesive layer 16 is a pressure sensitive adhesive layer, then removable release liner 18 is optionally applied to adhesive layer 16 as shown schematically in FIGS. 1 and 2. Release liner 18 protects adhesive layer 16 from damage and can prevent unwanted adhesion of the adhesive layer to objects. Release liner 18 can also prevent adhesive from sticking to the top surface of the tamper indicating device when the tamper indicating device is available in roll form and the top surface of a tamper indicating device would otherwise be adjacent the adhesive layer. Alternatively, an anti-adhesion layer 36 can be present on overlaminate 30, as shown in FIG. 3. When anti-adhesion layer 36 is present, then release liner 18 need not be used. Anti-adhesion layer 36 can prevent adhesive layer 16 from adhering to the top surface of overlaminate 30.

When a flood coat is present, adhesive layer 16 is bonded to the flood coat 28. When no flood coat 28 is present, adhesive layer 16 is bonded directly to the second side 26 of tamper indicating backing 12. Adhesive layer 16 is provided to adhere the tamper indicating device 10 to an object 32 (shown in FIGS. 3 to 7). The adhesive layer 16 should be selected such that the adhesive bond between the adhesive layer 16 and the object to which the tamper indicating device 10 is adhered is greater than the cohesive strength of the frangible film 58 (that is, greater than the force required to separate the first side 24 and the second side 26 of the tamper indicating backing 12 from each other). In this manner, attempts to remove the tamper indicating device 10 from the article (by overcoming the adhesive bond to the object 32) will cause the tamper indicating device 10 to activate by cohesive separation within the frangible film 58 of the tamper indicating backing 12 (shown in more detail with respect to FIG. 6).

Tamper indicating device 10 preferably includes an overlaminate 30 as shown in FIG. 1. Overlaminate 30 is preferably substantially transparent. Typically, overlaminate 30 comprises a top film 62 and an adhesive 64. Overlaminate 30 optionally comprises a release layer 36 as shown in FIG. 3. When overlaminate 30 is substantially transparent, then security markings 38, flood coat 28 and secured information 60 are visible and legible through overlaminate 30. The term "legible" means that security markings 38 and secured information 60 are readable as appropriate through overlaminate 30. For example, when secured information 60 and security markings 38 are indicia, "legible" means such indicia can be read or viewed without the aid of additional equipment. When security markings 38 and secured information 60 comprise encoded indicia, such as barcodes, the term "legible" means that such encoded indicia can be read with a barcode scanner and the like.

Tamper indicating device 10 may optionally include an overlaminate 30 attached to the first side 24 of tamper indicating backing 12, such as by adhesives, extrusion lamination, or co-extrusion. Overlaminate 30 is used to protect information such as security markings 38 printed on tamper indicating backing 12 from alteration or removal. Typically, overlaminate 30 comprises a top film and an adhesive layer. Acceptable materials for the top film include but are not limited to films of polyester, polypropylene, polycarbonate, and SURLYN resin available from E. I. du Pont de Nemours and Company, Wilmington Del. One preferred film is a 0.025 mm (0.00012 inch) thick biaxially oriented polypropylene film with an acrylic based adhesive commercially available as 3M 311 from 3M Company, St. Paul, Minn. Depending on the material and the intended use, overlaminate 30 will typically have a thickness of from 0.013 to 0.13 mm (0.0005 to 0.005 inches). Security markings 38 are applied, either on the first surface 24 of the tamper indicating backing 12 or on the surface of the overlaminate 30 facing the tamper indicating backing 12. Additional security markings may be provided on either side of the overlaminate 30, when desired. Overlaminate 30 is typically a pressure-sensitive adhesive coated film. However, overlaminate 30 may also be a heat sealed laminate, hot melt laminate, or a clear layer or layers coated or extruded onto tamper indicating backing 12 after application of security markings 38.

When an overlaminate 30 is used (as shown in FIGS. 1, 3, 4, 6, and 8), the top surface 34 of the tamper indicating device is the top surface of the overlaminate 30 (that is, the major surface of the top film of overlaminate 30 that is on the opposite side of the first side 24 of the tamper indicating backing). When overlaminate 30 comprises an anti-adhesion layer, the top surface of overlaminate 30 is the anti-adhesion layer 36 as shown in FIG. 3.

A removable release liner may cover the adhesive layer, which is preferably a premium release type such as a silicone release liner. It should be noted that varying the amount of adhesive layer applied to the tamper indicating backing can vary the level of adhesion between such a liner and the adhesive layer. Typically, when device 10 is wound in a roll, a silicone acrylate release layer such as a coating manufactured by Goldschmidt Chemical Corp., Hopewell, Va., is disposed onto the top surface of the overlaminate 30 (when present) or onto the first side 24 of the tamper indicating backing 12 over the top of any security markings 38. This release layer is an anti-adhesion layer 36 that prevents adhesive 16 from adhering to the top surface of the tamper indicating device 10. Preferably, when anti-adhesive layer 36 is used, removable release liner 18 is not included as part of tamper indicating device 10.

Examples of secured information could include winning numbers, game numbers, software registration codes, software internet download codes, combination codes, drug dates, clinical trial information, databases, online banking information, and personal identification numbers (PIN numbers). Information can be on a computer chip, a radio frequency identification tag, or maybe the information is written in Braille.

For example, when the information is contained in a radio frequency identification ("RFID") tag, the RFID tag could be read without the tamper indicating device being activated. Furthermore, the tamper indicating device could obscure identifying information printed on the tag such as a serial number and even obscure the RFID tag altogether, making its presence unknown to the casual observer.

Additionally, the "information" can be a multilayer optical film, which itself is a security feature but can provide additional information when the tamper indicating device is removed or activated. Information to be secured can also be an object such as access fasteners, electronic indicators, such as meters, RFID tags, chips, and the like. For example, the object-to-be-secured could be a meter. The meter could be an electronic indicator or a chemical indicator, or it could be a temperature-indicating strip, showing the minimum or maximum temperature that an object (to which the meter has been attached) has been exposed.

Tamper indicating device 10 is applied to object 32 covering the secured information 60. Secured information is substantially or alternatively entirely within the area of window 68 in flood coat 28. However, the mask 70 covers the secured information 60 from view so that secured information cannot be accessed or viewed without activation of the tamper indicating device. Mask 70 can be much bigger than window 68, and normally will be at least as big as the window.

Preferably security markings 38 are applied to the first side 24 of the tamper indicating backing 12. Typically security markings 38 will be indicia such as letters, words, numbers, symbols, images or other visual markings containing information, and the security markings (whether indicia or not) are preferably colored the same color as the color of the flood coat 28. Therefore such security markings 38 are hidden by flood coat 28, that is, security markings are not visible (or are visible with difficulty) in the inactivated tamper indicating device because they have insufficient contrast against the flood coat when viewed from the top surface 34 of the tamper indicating device. Security markings 38 may be, for example, printed in a repeat pattern on the first side 24 of the tamper indicating backing 12. Security markings 38 could contain information related in some way to the secured information, such as the same indicia as the secured information or indicia that are complimentary to the secured information.

Security markings 38 need not be colored the same as flood coat 28. For example, if flood coat 28 is blue and security markings 38 are red, security markings 38 may appear to be red-blue (or purple). When the tamper indicating device is activated, such security markings 38 appear to change, changing from a red-blue appearance to a red color. In this example, the security markings could indicate the activation of the tamper indicating device by changing perceived color from red-blue to red. The tamper indicating device is not limited to a red/blue combination. Many other color changes are possible.

The information displayed by security markings 38 may also be varied. Such information could include identification such as the serial number of an object 32, to indicate the object is authentic, or any other information that is specifically intended for the particular object 32 to which the tamper indicating device 10 is adhered. The tamper indicating device 10 does not prevent the secured information 60 from being read, but in embodiments employing a mask, the tamper indicating device 10 does show whether such information has been previously revealed or not. Thus an article may be, for example, sent by mail such as a CD case with a serial number or a confirmation code (i.e., the secured information). The recipient of the article can peel back the top of the tamper indicating device, activating the tamper indicating device and revealing the confirmation code. The confirmation code can then be checked against a list of approved confirmation codes for this shipment of articles ensuring that the article is not counterfeit. The recipient can be sure that the information has not been copied because the tamper indicating device was not previously activated when received.

One example of an article 66 with secured information 60 is a lottery ticket. The operation of the tamper indicating device as part of a lottery ticket is illustrated for the sake of example. However, it will be appreciated by one of skill in the art that a web of tamper indicating devices can be made in a number of different ways and for a plethora of applications and uses. The object is prepared by printing a web of lottery cards with numbers, each number being unique. A web of tamper indicating devices 10 is produced by printing a flood coat 28 on the second side 26 using a technique such as gravure printing. The flood coat includes periodic regular windows, which are part of the gravure cylinder image. To the opposite (first) side 24 of the tamper indicating backing 12 is applied overlaminate 30 by lamination and masks 70 by, for example, gravure printing. For lottery cards, masks 70 are preferably in whole registration with windows 68. The web of tamper indicating devices is laminated onto the web of cards with masks and windows of the tamper indicating devices in whole registration with and obscuring the hidden numbers. The combined web is then converted (cut) into individual lottery cards. The tamper indicating device applied to an object is shown generically in FIG. 7. If this were an individual lottery card, then object 32 is the printed card; secured information 60 is the hidden number.

Many objects may be subject to additional security or need some indicator to determine if the object has been mishandled, tampered with, counterfeited and the like. Many times, the secured information may already be the object itself.

For example, serial numbers or lottery numbers may be imprinted on an object and it is important that the information not be readily available to the public. Or an object may require repair only by authorized technicians or service people and access to the object voids the warranty. There are many things that can be protected by security tamper-evident tapes or labels, particularly those that are part of the object.

Tamper indicating device 10 may be attached to an object 32 by means of adhesive layer 16 as shown in FIGS. 3-6 and 8 to form article 66. Release liner 18 (when present) is first removed, and then adhesive layer 16 is used to secure tamper indicating device 10 to object 32.

For example, object 32 could be a lottery ticket and the secured information 60 is winning numbers printed onto the ticket. Tamper indicating device 10 is then attached to object 32, covering secured information 60. Any indicators of information that needs to be secured can be "hidden" by the tamper indicating devices of the present invention. Such information can be in the form of writing (alphanumeric characters), images, drawings, encoded data or indicia and a combination of information. Such secured information 60 can also include information that has been embossed, engraved, etched or otherwise placed onto an object.

When attempts are made to separate the tamper indicating device 10 from an object 32, the tamper indicating device 10 is activated. Such separation attempts can be simply trying to pull the tamper indicating device from the object or trying to slide a sharp object, such as a razor blade, under the adhesive layer. A force generated between the first side 24 and the second side 26 of tamper indicating backing 12 causes activation of the tamper indicating device due to fracture or internal delamination within the frangible film 58 of the tamper indicating backing 12. When the frangible film 58 internally delaminates and separates into two portions, first portion 72 of frangible film and second portion 74 (as shown schematically in FIG. 6) become less transparent. The force generated by attempting to remove the tamper indicating device 10 from the object 32, referred to as the "peel force," generally causes the tamper indicating backing 12 to internally delaminate and separate as shown in FIG. 6, due to fracture. In order for the tamper indicating device 10 to separate (providing an indication that the tamper indicating device 10 has been tampered with and has been activated) the adhesive layer 16 bonds the second side 26 of the tamper indicating backing 12 to the object 32 with a bond strength that is greater than the internal delamination force of the frangible film 58. By varying the thickness and the type of adhesive layer 16, the level of adhesion between the application surface 44 of the object and the tamper indicating device 10 can be varied. The adhesive force, however, is always greater than the force required to internally delaminate the frangible film 58, so that when peeling force is applied to the tamper indicating device 10, the backing 12 will separate and the second portion 42 of the backing 12 will remain bonded to the object 32.

When the first portion 40 of the tamper indicating device 10 is replaced onto the second portion 42 of the tamper indicating device 10, the appearance of the flood coat 28 through the top surface 34 of the tamper indicating device is now changed because first 72 and second 74 portions of the frangible film are more light diffusive than before activation of the tamper indicating device 10. First 72 and second 74 portions appear milky. The color of the flood coat, as then viewed through the first 40 and second 42 portions of the tamper indicating backing 12, however appears changed since it is viewed through the portions 40 and 42 with increased opacity. Therefore, after activation of the tamper indicating device 10, there is now sufficient contrast in the perceived color of security markings 38 and flood coat 28, that security markings are easily viewable. When first portion 40 of the tamper indicating device 10 is entirely removed from the tamper indicating device 10, then flood coat 28 is still viewed through the second portion 74 of the frangible film. The second portion 74 of the frangible film is cloudy and flood coat 28 appears less saturated in color than before activation because the flood coat is viewed through the cloudy second portion.

The tamper indicating backing 12 internally delaminates substantially in the longitudinal direction of the tamper indicating device 10 as indicated by arrow 46 in FIG. 6. Upon internal delamination, the separated portions 40 and 42 of the frangible film 58 become cloudy, and increase in opaqueness. In other words, when the first portion 40 of the tamper indicating device 10 is put back together with the second portion 42 of the tamper indicating device 10, the flood coat 28 is partially obscured and cannot be easily viewed through the top surface 34 of the tamper indicating device. The opaqueness is due to surface irregularities of internal surfaces 48 of the tamper indicating backing 12 created during the internal delamination of the tamper indicating backing 12. Since the flood coat 28 (when present) is no longer completely perceptible through the first side 26 of tamper indicating backing 12, security markings 38 are no longer camouflaged. Security markings, could, for example be indicia such as "Activated" or "Tampered" or "Void".

Figure 9A:
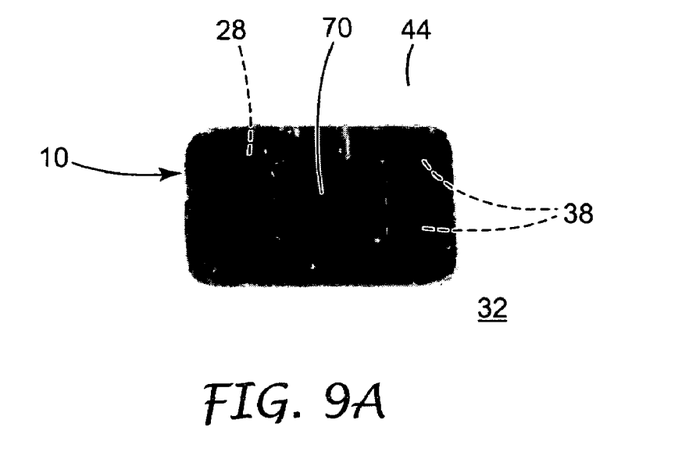
FIG. 9A shows a tamper indicating device not activated.
Figures 9B, 9C:
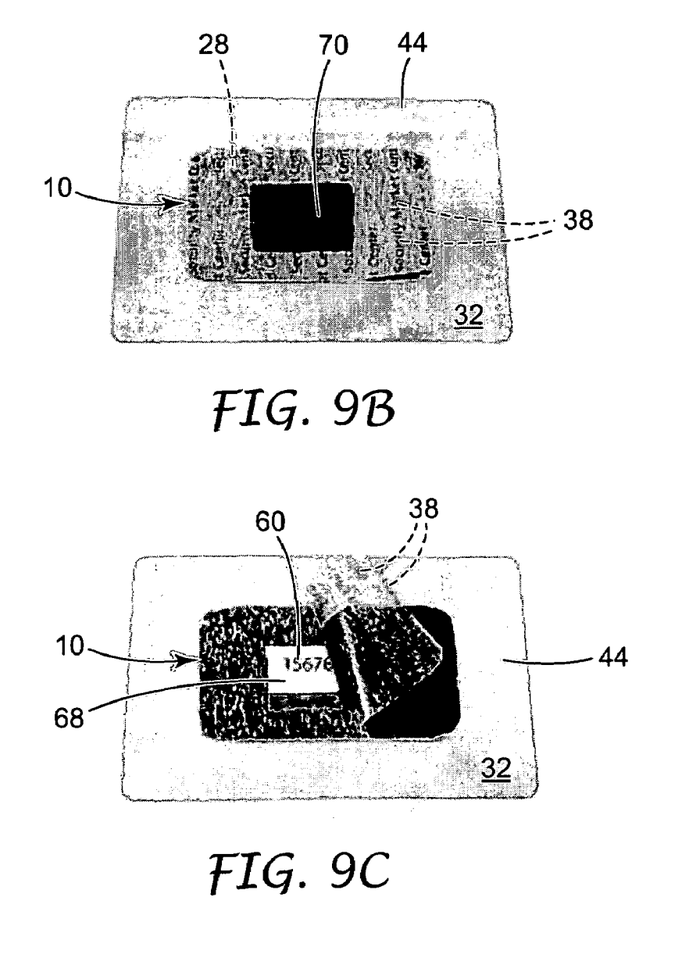
FIG. 9B shows a similar tamper indicating device to that in FIG. 9A, but the tamper indicating device is activated and the first portion of the tamper indicating device is not removed from the device.
FIG. 9C shows an activated tamper indicating device of the present invention wherein the first portion of the tamper indicating device is partially peeled back from the second portion of the tamper indicating device partially revealing the secured information.

With reference to FIGS. 9A, 9B and 9C: Before activation of the tamper indicating device 10, security markings 38 are illegible or legible with difficulty. The security markings—in this case indicia reading "SECURITY MARKET CENTER"—are camouflaged against the flood coat. This can be seen in FIG. 9A. Attempts to remove the tamper indicating device 10 from the object 32—in the embodiment of FIGS. 9A-C, the object is a piece of white card—cause activation of the tamper indicating device by fracturing of the frangible film and internal delamination of the tamper indicating backing 12. After the internal delamination of the frangible film 58, the security markings 38, which were previously camouflaged by the flood coat 28, are now legible as can be seen in the image in FIG. 9B. In the image of FIG. 9B, the security markings have sufficient contrast with the flood coat to be easily visible and readable. Because the security markings 38 are now readily perceptible, this indicates that an attempt to remove the tamper indicating device 10 from object 32 or an attempt to reveal information 60 was made. FIG. 9C shows the tamper indicating device 10, wherein the first portion of the tamper indicating device is being peeled back from the second portion of the tamper indicating device and the secured information is revealed. Thus, the tamper indicating device 10 provides an unambiguous indication of tampering, even when first portion 40 of the tamper indicating device is completely removed from the article 66 and discarded. When desired, the security markings 38 can include alphanumeric characters forming a message indicating that the object 32 is "OPEN", "ACTIVATED" or "VOID" (or any other message) when the tamper indicating device 10 is activated.

The operation of the present invention is illustrated with regard to the following examples. The examples are offered to illustrate multiple embodiments of the invention. It should be understood, however, that although the examples use specific thicknesses and materials, many variations and modifications might be made to the tamper indicating device 10 while remaining within the scope of the present invention.

EXAMPLES

Materials

All materials are commercially available, unless otherwise noted. All percentages are by weight unless otherwise noted.

Frangible Film

1. FINA 8473: a random copolymer of propylene/ethylene with an approximate ratio of 96:4 respectively (available from FINA Oil and Chemical Company, Dallas, Tex.). In these examples, this formed the first (continuous) phase.

2. EVAL-E105A: an ethylene vinyl alcohol copolymer terpolymer containing 44 mole percent ethylene (available from EVAL Company of America, Lisle, Ill.). In these examples, this formed the second (discontinuous) phase.

Tamper Indicating Backing

The tamper indicating backing was made as outlined in U.S. Pat. No. 6,395,376, Examples 1-3, and had the following composition: 75% by weight FINA 8473 for the first phase and 25% by weight EVAL E105A for the second phase. The thickness of this frangible film was approximately 0.064 mm. (0025 inches).

Adhesive 2-ethylhexyl acrylate based pressure-sensitive adhesive similar to that described in U.S. Pat. No. 5,804,610, except that it consisted of 6 parts acrylic acid, 0.005 parts ABP, 0.1 parts 10TG and 0.15 parts Irgacure 651.

Example 1

The tamper indicating backing of the composition described above was corona treated on one side (the second side) and the corona treated side was printed with a dark blue ink flood coat by flexographic printing. The flood coat included windows where no ink was printed. The film was turned over and the first side of the tamper indicating backing was flexographically printed with indicia reading "Security Market Center" in the same blue ink as that used for the flood coat. A transparent pressure sensitive propylene overlaminate (available from ACPO Ltd. of Oak Harbor, Ohio) was laminated adhesive-side onto the indicia onto the first side of the tamper indicating backing. A self-wound pressure sensitive transfer adhesive (# 9445 available from 3M Company, St. Paul, Minn.) was hand laminated using a rubber Brayer hand roller onto the second side (the flood coated side) of the tamper indicating backing. Finally, tamper indicating devices were cut from the web of laminated tamper indicating backing. The transfer liner was removed from the pressure sensitive transfer adhesive of the tamper indicating device and the device was adhered to light blue card stock having the number "1567843" printed thereon, with the window of the device positioned so that the window surrounded the number and the number was visible in the window. The top of the tamper indicating device (the surface of the overlaminate) was then shaded by hand with a black marker pen to form the mask. The completed article with the tamper indicating device appeared dark blue with black masked areas and the number was not visible. The top of the tamper indicating device was then peeled back. The flood coat now appeared less dark and less saturated in color. The "Security Market Center" indicia was then visible against the now less-saturated blue flood coat. By peeling back the top of the tamper indicating device, the hidden number 1567843 was revealed.

Example 2

A sample of tamper indicating backing with overlaminate made as described in Example 1 was used. To the second side of the tamper indicating backing was applied a pressure-sensitive adhesive colored with a red pigment from Spectra Colors Corporation located in Kearny, N.J. by hand lamination. To the first side of the tamper indicating backing was applied matching red security markings were applied. The indicia were not legible or clearly visible against the red pigmented adhesive. The tamper indicating backing did not have a flood coat. A mask was applied using a Magic Marker™ pen made by Bic Company located in Milford, Conn.

The tamper indicating device was then applied to a piece of white card. The tamper indicating device was activated by peeling the tamper indicating device from the white card and the red security markings became clearly visible and legible.

Example 3

This tamper indicating device sample of this example were made in the same manner as described in Example 1, except that the mask was applied using a Magic Marker™ pen onto the first side of the tamper indicating backing before lamination of the overlaminate onto the backing. The tamper indicating device was applied to a card, which was printed with a code number. Attempts to remove the tamper indicating device from the card without activating the tamper indicating device were made by trying to separate the pressure sensitive transfer adhesive and the card. All attempts to separate the tamper indicating device from the card resulted in the device being activated. Upon activation of the tamper indicating device, the number on the card hidden by the tamper indicating device was revealed and the blue indicia security marking "Security Market Center" clearly became visible.

The examples described above are intended solely to be illustrative and variations in the testing procedure can be expected to yield different results.

The present invention has now been described with reference to several embodiments thereof. The foregoing detailed description and examples have been given for clarity of understanding only. No unnecessary limitations are to be understood therefrom. Unless stated otherwise or unless context requires otherwise, all percentages and ratios of component materials is provided in percent by weight or parts by weight, respectively. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures. All references cited in the above specification are incorporated by reference herein.

While the above-identified figures set forth some preferred embodiments of the invention, other embodiments are also contemplated, as noted in the discussion. In all cases, this disclosure presents the invention by way of representation and not limitation. It should be understood that numerous other modifications and embodiments can be devised by those skilled in the art which fall within the scope and spirit of the principle of the invention.

What is claimed is:

1. A tamper indicating device comprising:
    a backing having a first side and a second side, wherein the backing comprises a first phase and a second phase, wherein the backing has a first level of light diffusion, and when a peeling force is applied to the backing, the backing internally delaminates and has a second level of light diffusion that is a higher level of light diffusion than the first level of light diffusion;
    a flood coat applied to the second side of the backing, the flood coat defining a window therein; and
    a mask on an outer surface of the tamper indicating device, the mask being in partial or whole registration with the window in the flood coat,
    wherein the mask and the flood coat are located on opposite sides of the backing.

2. The tamper indicating device of claim 1, wherein the tamper indicating device further comprises at least one security marking applied to the first side of the backing, wherein the security marking has substantially the same color as the flood coat.

3. The tamper indicating device of claim 2, wherein security markings are colored the same color as the color of the flood coat.

4. The tamper indicating device of claim 1, further comprising an adhesive layer bonded to the flood coat.

5. The tamper indicating device of claim 4, wherein the adhesive layer is a pressure sensitive adhesive layer, and wherein the tamper indicating device further comprises a release liner applied to the pressure sensitive adhesive layer.

6. A tamper indicating device comprising:
    a backing having a first side and a second side, wherein the backing comprises a first phase and a second phase, wherein the backing has a first level of light diffusion, and when a peeling force is applied to the backing, the backing fractures and has a second level of light diffusion that is a higher level of light diffusion than the first level of light diffusion;
    a flood coat applied to the second side of the backing, the flood coat defining a window therein;
    a mask on the tamper indicating device, the mask being in partial or whole registration with the window in the flood coat, wherein the mask and the flood coat are located on opposite sides of the backing; and
    an adhesive layer bonded to the flood coat.

7. The tamper indicating device of claim 6, wherein the tamper indicating device further comprises at least one security marking applied to the first side of the backing, wherein the security marking has substantially the same color as the flood coat.

8. The tamper indicating device of claim 7, wherein security marking is colored the same color as the color of the flood coat.

9. The tamper indicating device of claim 6, wherein the adhesive layer is a pressure sensitive adhesive layer, and wherein the tamper indicating device further comprises a release liner applied to the pressure sensitive adhesive layer.

10. The tamper indicating device of claim 6, wherein the peeling force is insufficient to separate the flood coat from the second side of the backing.

11. An article, comprising:
    an object having secured information;
    a tamper indicating backing having a first side and a second side, wherein the backing comprises a first phase and a second phase, wherein the backing is light transmissive, and wherein a peeling force causes the backing to fracture and become more opaque;
    an adhesive layer applied to the second side of the backing, wherein the adhesive layer is colored, and wherein the adhesive layer is bonded to an application surface of the object; and a mask applied to the tamper indicating device, wherein the mask obscures the secured information of the object, wherein the adhesive lever is disposed between the mask and the secured information, and wherein the backing is disposed between the mask and the adhesive layer.

12. The article of claim 11, wherein the tamper indicating device further comprises at least one security marking applied to the first side of the backing.

13. The article of claim 12 further comprising a flood coat applied to the second side of the backing, the flood coat defining a window therein, wherein security markings have substantially the same color as the color of the flood coat.

14. The article of claim 11, wherein the adhesive layer is a pressure sensitive adhesive layer, and wherein the tamper indicating device further comprises a release liner applied to the pressure sensitive adhesive layer.

15. An article including a tamper indicating device, comprising:
    an object having secured information;
    a tamper indicating device comprising:
        a backing having a first side and a second side, wherein the backing comprises a first phase and a second phase, wherein the backing has a first level of light diffusion, and when a peeling force is applied to the backing, the backing fractures and has a second level of light diffusion that is a higher level of light diffusion than the first level of light diffusion;
        a flood coat applied to the second side of the backing; and
        a mask applied to the tamper indicating device, such that the mask obscures the secured information of the object, wherein the backing is disposed between the mask and the flood coat; and
    an adhesive layer attaching the tamper indicating device to the object,
    wherein the flood coat is disposed between the mask and the object.

16. The article of claim 15, wherein the flood coat defines a window.

17. The article of claim 15, wherein the tamper indicating device further comprises at least one security marking applied to the first side of the backing, wherein the security marking has substantially the same color as the flood coat.

18. The article of claim 17, wherein security markings are colored the same color as the color of the flood coat.

19. The article of claim 15, wherein the adhesive layer is bonded to the flood coat.

20. The article of claim 19, wherein the adhesive layer is a pressure sensitive adhesive layer, and wherein the tamper indicating device further comprises a release liner applied to the pressure sensitive adhesive layer.

21. The article of claim 15, wherein the adhesive is configured to attach the tamper indicating device to the object with a bond strength that enables the tamper indicating device to remain at least partially attached to the object upon application of the peeling force.

22. An article including a tamper indicating device, comprising:
    an object having secured information;
    a tamper indicating device comprising:
        a backing having a first side and a second side, wherein the backing comprises a first phase and a second phase, wherein the backing has a first level of light diffusion, and when a peeling force is applied to the backing, the backing internally delaminates and has a second level of light diffusion that is a higher level of light diffusion than the first level of light diffusion;
        a flood coat applied to the second side of the backing; and
        a mask applied to the tamper indicating device, such that the mask obscures the secured information of the object, wherein the flood coat and the mask are located on opposite sides of the backing; and
    an adhesive layer attaching the tamper indicating device to the object, wherein the adhesive layer is adjacent to the flood coat.

23. The article of claim 22, wherein the flood coat defines a window.

24. The article of claim 22, wherein the tamper indicating device further comprises at least one security marking applied to the first side of the backing, wherein the security marking has substantially the same color as the flood coat.

25. The article of claim 24, wherein security markings are colored the same color as the color of the flood coat.

26. The article of claim 22, wherein the adhesive layer is bonded to the flood coat.

27. The article of claim 26, wherein the adhesive layer is a pressure sensitive adhesive layer, and wherein the tamper indicating device further comprises a release liner applied to the pressure sensitive adhesive layer.

28. The article of claim 22, wherein an adhesive bond between the adhesive layer and the object is greater than a cohesive strength required to separate the first side and the second side of the backing.

* * * * *

UNITED STATES PATENT AND TRADEMARK OFFICE
CERTIFICATE OF CORRECTION

PATENT NO. : 7,422,781 B2
APPLICATION NO. : 10/828453
DATED : September 9, 2008
INVENTOR(S) : Raymond Robert Gosselin It is certified that error appears in the above-identified patent and that said Letters Patent is hereby corrected as shown below:

Column 19
Line 3; In Claim 11, delete "lever" and insert -- layer --, therefor.
Line 13; In Claim 14, delete "arficle" and insert -- article --, therefor.

Signed and Sealed this

Thirtieth Day of November, 2010

David J. Kappos
*Director of the United States Patent and Trademark Office*